(12) United States Patent
Kneckt et al.

(10) Patent No.: US 9,402,254 B2
(45) Date of Patent: Jul. 26, 2016

(54) METHOD AND APPARATUS FOR DEVICE DISCOVERY THROUGH BEACONING

(75) Inventors: Jarkko Lauri Sakari Kneckt, Espoo (FI); Klaus Franz Doppler, Berkeley, CA (US); Mika Petri Olavi Rinne, Espoo (FI)

(73) Assignee: Nokia Technologies Oy, Espoo (FI)

( * ) Notice: Subject to any disclaimer, the term of this patent is extended or adjusted under 35 U.S.C. 154(b) by 282 days.

(21) Appl. No.: 13/637,365

(22) PCT Filed: Mar. 30, 2010

(86) PCT No.: PCT/IB2010/000717
§ 371 (c)(1),
(2), (4) Date: Dec. 4, 2012

(87) PCT Pub. No.: WO2011/121374
PCT Pub. Date: Oct. 6, 2011

(65) Prior Publication Data
US 2013/0170470 A1    Jul. 4, 2013

(51) Int. Cl.
*H04W 72/04* (2009.01)
*H04W 48/08* (2009.01)
*H04W 8/00* (2009.01)
*H04W 72/02* (2009.01)

(52) U.S. Cl.
CPC .......... *H04W 72/0446* (2013.01); *H04W 48/08* (2013.01); *H04W 8/005* (2013.01); *H04W 72/02* (2013.01)

(58) Field of Classification Search
CPC ........ H04W 4/08; H04W 72/02; H04W 4/008
USPC .......................................................... 370/319
See application file for complete search history.

(56) References Cited

U.S. PATENT DOCUMENTS

| 7,492,736 B2* | 2/2009 | Ho ........................ H04W 48/08 370/230 |
| 8,300,715 B2* | 10/2012 | Li et al. .......................... 375/260 |
| 2005/0177639 A1 | 8/2005 | Reunamaki et al. |
| 2007/0002809 A1* | 1/2007 | Reunamaki et al. .......... 370/338 |
| 2007/0211680 A1* | 9/2007 | Laroia et al. .................. 370/338 |

(Continued)

FOREIGN PATENT DOCUMENTS

| GB | 2453936 A | 4/2009 |
| WO | 20051076544 A1 | 8/2005 |

(Continued)

OTHER PUBLICATIONS

Alnuweiri et al., "OFDMA-Based Medium Access Control for Next-Generation WLANs", EURASIP Journal on Wireless Communications and Networking—Special issue on OFDMA architectures, protocols, and applications, vol. 2009, Article No. 16, Jan. 18, 2009, pp. 1-9.

(Continued)

*Primary Examiner* — Shaq Taha
(74) *Attorney, Agent, or Firm* — Harrington & Smith

(57) ABSTRACT

In accordance with an example embodiment of the present invention, a method comprises identifying at least one beacon opportunity at a wireless network device; selecting a beacon channel from a beacon slot that is a flexibly allocated frequency resource; and transmitting at least one beacon signal in the selected beacon channel multiplexed in a beacon frame during the identified beacon opportunity.

21 Claims, 7 Drawing Sheets

(56) References Cited

U.S. PATENT DOCUMENTS

| | | | |
|---|---|---|---|
| 2008/0175213 A1* | 7/2008 | Hansen | 370/338 |
| 2008/0205340 A1 | 8/2008 | Meylan et al. | |
| 2008/0232311 A1 | 9/2008 | Reumerman et al. | |
| 2008/0259877 A1* | 10/2008 | Habetha | H04W 74/002 370/336 |
| 2009/0116430 A1* | 5/2009 | Bonta et al. | 370/329 |
| 2009/0225730 A1 | 9/2009 | Kesselman et al. | |
| 2010/0304772 A1* | 12/2010 | Wang | H04W 56/003 455/509 |
| 2011/0134827 A1* | 6/2011 | Hooli et al. | 370/315 |
| 2011/0268004 A1* | 11/2011 | Doppler et al. | 370/311 |
| 2012/0265818 A1* | 10/2012 | Van Phan et al. | 709/204 |

FOREIGN PATENT DOCUMENTS

| | | |
|---|---|---|
| WO | 20081036129 A1 | 3/2008 |
| WO | 20081056023 A1 | 5/2008 |

OTHER PUBLICATIONS

International Search Report and Written Opinion received for corresponding Patent Cooperation Treaty Application No. PCT/IB2010/000717, dated Nov. 23, 2010, 10 pages.

* cited by examiner

METHOD AND APPARATUS FOR DEVICE DISCOVERY THROUGH BEACONING

RELATED APPLICATION

This application was originally filed as PCT Application No. PCT/IB2010/000717 filed Mar. 30, 2010.

TECHNICAL FIELD

The present application relates generally to a method and apparatus for device discovery through beaconing.

BACKGROUND

An optimized local access (OLA) network is a wireless local area network that supports different connection modes to maximize the connectivity between network devices in a local area. The connection modes may include access point (AP)-facilitated connection mode and ad-hoc, or device-to-device (D2D) connection mode. The devices within an OLA network may be locally synchronized. The local synchronization enables a D2D beaconing and handshake among the devices as well as the D2D beaconing and handshake with surrounding OLA networks. The OLA network may utilize the license-exempt spectrum or white spaces in addition to licensed spectrum to take advantage of the available bandwidth.

In a D2D or an ad-hoc connection mode, one of first steps for establishing a D2D connection is to discover the presences of neighbor devices. Given the highly dynamic and mobile nature of the devices in such a network, discovery of the neighbor devices and subsequent hand-shake to establish connections need to be efficient and fast.

The OLA network may use Orthogonal Frequency Division Multiplexing (OFDM) transmission scheme that uses a large number of carriers spaced apart at slightly different frequencies. The OFDM transmission scheme breaks up one data stream into multiple signals. Many carriers, also known as "subcarriers," are used for a single data channel.

SUMMARY

Various aspects of examples of the invention are set out in the claims.

According to a first aspect of the present invention, a method comprises identifying at least one beacon opportunity at a wireless network device; selecting a beacon channel from a beacon slot that is a flexibly allocated frequency resource; and transmitting at least one beacon signal in the selected beacon channel multiplexed in a beacon frame during the identified beacon opportunity.

According to a second aspect of the present invention, a method comprises identifying a beacon opportunity at a network device; selecting a beacon slot that is a flexibly allocated frequency resource; receiving at least one beacon frame from at least one neighbor wireless device during the identified beacon opportunity; and determining a presence of at least one neighbor D2D device from the at least one received OFDM beacon frame.

According to a third aspect of the present invention, an apparatus comprises a beacon module configured to identify at least one beacon opportunity at a wireless network device; and select a beacon channel from a beacon slot that is flexibly allocated in a frequency resource; and an interface module configured to transmit at least one beacon signal in the selected beacon channel multiplexed in a beacon frame during the identified beacon opportunity.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 8 of the drawings.

Figure 1A:
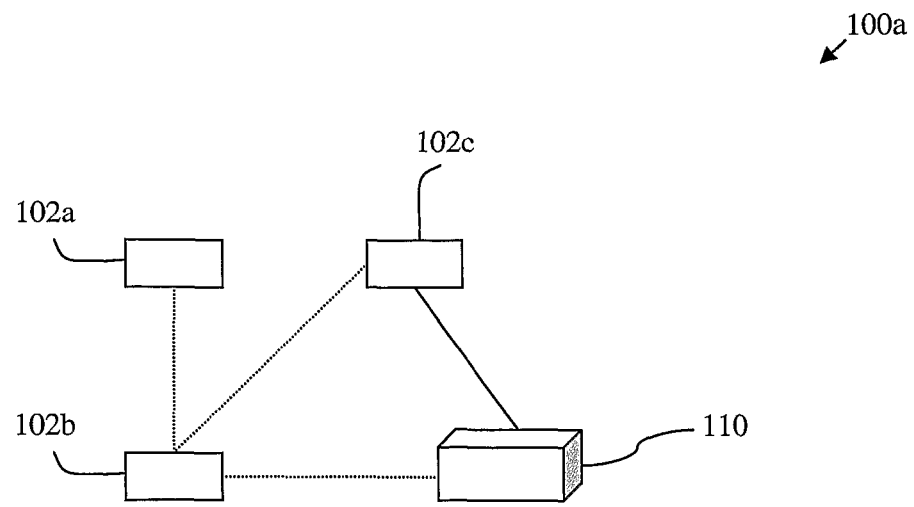
FIG. 1a illustrates an example optimized local access (OLA) network in accordance with an example embodiment of the invention.

FIG. 1a illustrates an example wireless local area network 100. The example wireless local area network 100 may include an access point 110, and a set of user equipments (UEs) 102a, 102b and 102c. UE 102a may communicate with UE 102b via a D2D communication link. Similarly, the UEs 102b and 102c may communicate with each other either via a direct D2D communication link or via the access point 110.

In one example embodiment of the OLA network 100, the UEs 102a, 102b and 102c roams into a conference room for a meeting at approximately same time where the local area network 100 is available. Each UE may listen first to beacons from neighbor devices such as other LTEs and the access point 110. In an example embodiment, each of the UEs is configured to transmit short beacon multiplexed into an orthogonal frequency-division multiplexing (OFDM) frame. All the UEs may transmit the OFDM beacon frames in an orthogonal frequency-division multiple access (OFDMA) scheme at approximately same time within the cyclic prefix of the OFDM symbol. In the OFDMA scheme, transmission of multiple beacon signals by multiple devices is achieved by each transmitting UE device modulating different subsets of subcarriers. Each UE may receive multiple beacon frames from all neighbor devices at approximately same time during beacon opportunities, and soon learn the presence of other UEs without waiting for other UEs to transmit beacons in a sequential manner at arbitrary times. For example, once UE 102a learns of the presences of other UEs 102b and 102c and the AP 110, it may decide to establish a D2D communication with another UE such as 102b via a handshake procedure and initiate a D2D communication session.

In one example embodiment, local synchronization may be acquired between the UEs 102a, 102b and 102c themselves, or between the UEs and the access point 110 in order for the UEs and the access point to have a common understanding of the beacon opportunity. If the UEs and the access point 110 are not synchronized on the beacon opportunity initially, the UEs may at least detect timing of its neighboring UEs or the access point 110 via physical layer signals each transmits. A lack of or a poor local synchronization on beacon opportunity may result in a reduced beaconing efficiency.

Figure 1B:
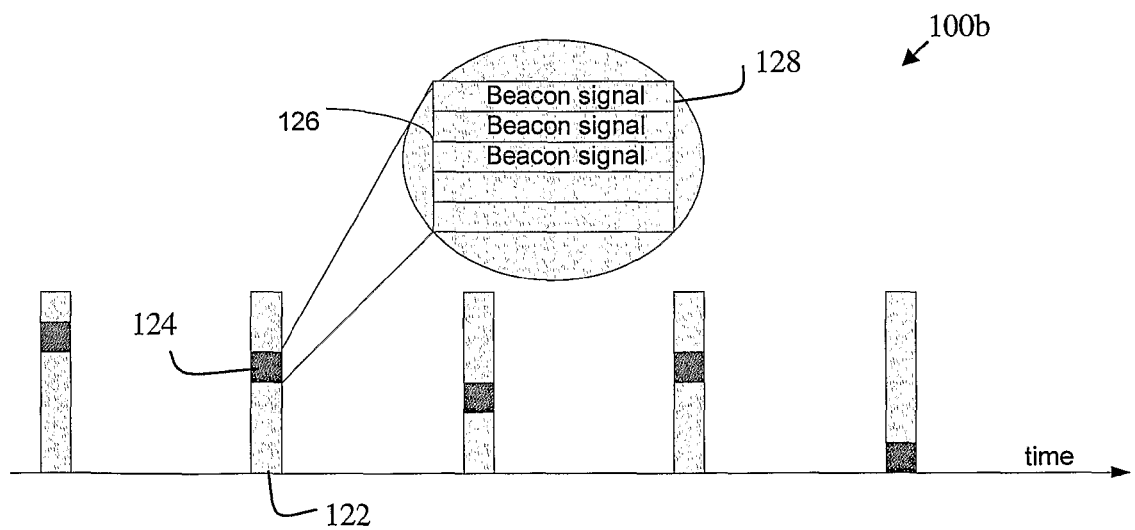
FIG. 1b illustrates an example beacon opportunity and beacon slot in accordance with an example embodiment of the invention.

FIG. 1b illustrate example beacon structure 100b in accordance with an example embodiment of the invention. The beacon structure 100b includes a beacon opportunity 122 and a beacon slot 124. The beacon opportunity 122 is a time instant when beacons may be transmitted or received. The beacon slot 124 is a flexibly allocated frequency resource that may be used for transmitting or receiving beacons or beacon signals in beacon channels during the beacon opportunity. Multiple beacon channels 128 may be multiplexed into an OFDM beacon frame 126. The OFDM beacon frame 126 is an information composition of all beacon signals present in a beacon slot at one beacon opportunity. A beacon signal is a decodable beacon message that includes a number of information elements transmitted by a wireless device. The terms beacon and beacon signal are used interchangeably hereinafter.

Figure 2:
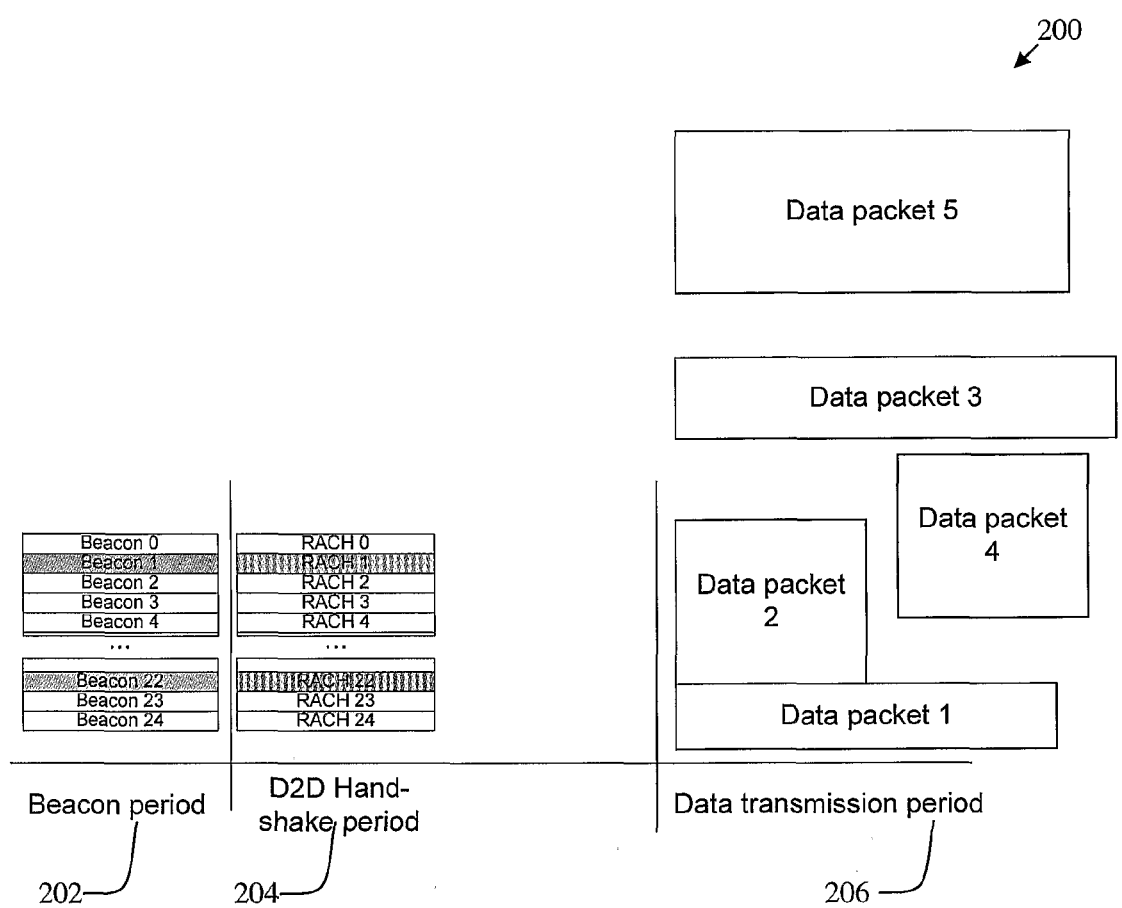
FIG. 2 illustrates an example D2D communication session in accordance with an example embodiment of the invention.

FIG. 2 illustrates an example D2D session 200 in accordance with an example embodiment of the invention. The D2D communication session 200 includes a beacon period 202, a D2D handshake period 204, and a data transmission period 206. There may be one or more beacon opportunities in the beacon period 202. During a beacon opportunity of the beacon period 202, each of the D2D devices may transmit one beacon contained in an OFDMA beacon frame. During the D2D handshake period 204, a beacon receiver may transmit random access request to the beacon transmitters, and the D2D devices may exchange information about available resources and go through a resource request, service discovery and authorization process to establish a D2D connection. The subsequent D2D communication during the data transmission period 206 may not follow a fixed channel structure and may use a flexible spectrum usage (FSU) scheme for the data transmission. Then the communication period 206 may begin on a reserved resource.

Figure 3:
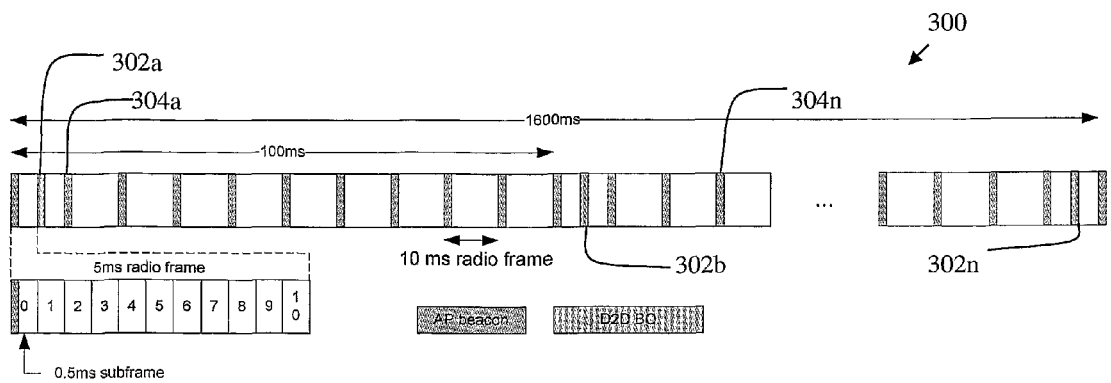
FIG. 3 illustrates an example beacon opportunities in accordance with an example embodiment of the invention.

FIG. 3 illustrates an example radio frame set 300 in accordance with an example embodiment of the invention. In the radio frame set 300, a beacon opportunity is repeated every 100 ms, and when it is reserved especially for D2D beaconing, it is denoted as D2D beacon opportunity (D2D BO). The radio frame set 300 includes a number of D2D beacon opportunities 302a, 302b, ... 302n, that are intertwined with the AP beacon transmissions 304a ... 304n. The D2D beaconing may be coordinated with the AP beacons of an OLA network operating on the same radio frames. In this example embodiment, an access point may transmit a beacon every 10 ms, and a D2D beacon opportunity may occur in radio frames which are not used for the AP transmissions. Thus, the access point may participate in the D2D beaconing and/or monitor D2D beacons. In one embodiment, the access point may be aware of D2D resourcing and activities rather than the actual D2D transmissions.

Figure 4:
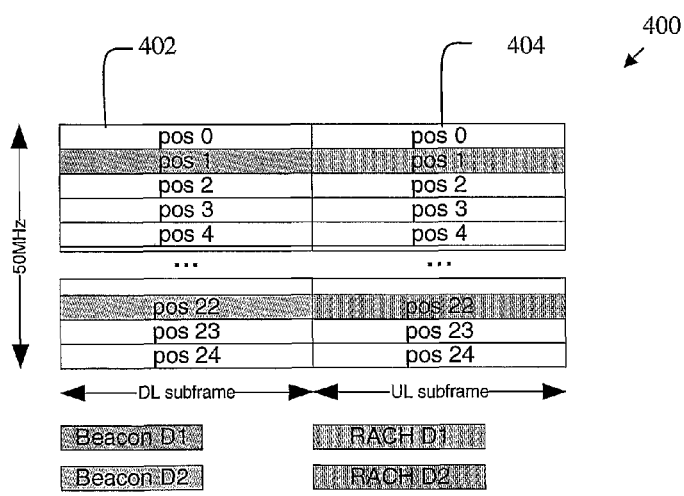
FIG. 4 illustrates an example beacon channels in accordance with an example embodiment of the invention.

FIG. 4 illustrates an example frame structure 400 within a beacon slot during a beacon opportunity allocated for D2D beaconing in accordance with an example embodiment of the invention. The frame structure 400 includes downlink subframe resources 402 and uplink subframe resources 404. The beacon slot is a flexibly allocated frequency resource for the beacon related communications. The frame structure 400 shows that the downlink subframe resources 402 may be used for D2D beacons which are further divided into beacon channels, e.g. 25 channels of 2 MHz each in this example. The channel pos 1 is reserved for the AP beacon D1 and channel pos 22 for the D2D beacon D2, inside the allocated beacon slot. In this example embodiment, the D2D beacon opportunities are coordinated with the AP beacons, and the beacons are concentrated in a single radio frame and in a single frequency band. Thus, a neighbor AP becomes aware of the D2D transmissions while scanning the beacon frame. This arrangement of beacon channel may have a number of advantages. First, the access points of a neighboring OLA network may protect D2D beacons by not transmitting on the resources reserved for D2D beacons. Also the D2D devices that form an ad-hoc network may only need to wake up once to hear the beacons of all D2D devices in the neighborhood and this may result in energy saving. Additionally, a D2D device may quickly and efficiently scan for other D2D devices in their D2D range and establish a D2D connection with a neighbor D2D device if it so desires.

FIG. 4 illustrates that the D2D beacons may be concentrated into a beacon slot in the frequency domain. A bandwidth of 50 MHz is used for the D2D beacon slot during the beacon opportunities. The beacon slot may be defined in one of the number of ways. It may be defined by a standard, or assigned or configured by an access point. The assignment or configuration by the access point may be done in cooperation with other access points in the local area. Similarly, a specific beacon channel in the beacon slot that is reserved for a D2D beacon may be defined in one of a number of ways. It may be defined by a standard or assigned by an access point on demand. Alternatively the D2D device may reserve the D2D beacon as part of the self organization function of the OLA network.

In one example embodiment, the downlink subframe resources 402 for beacons may be followed by uplink random access channel (RACH) resources 404 in which the random access request from devices may be transmitted. The downlink subframe resources may be the resources used by beacon transmitters and uplink subframe resources may be the resources used by other devices. The beacon transmitter may need to monitor the random access channel resources to detect random access requests directed to the beacon transmitter. The random access channel resources 404 allocated to a device may use the same beacon channel as the beacon transmissions of the device or they may follow a different logic. The beacon subframe may be followed by a random access subframe or allocated in parallel to the random access subframe. In either case, random access requests to multiple devices may be sent in parallel and one device may be configured to initiate a random access to multiple devices. In another embodiment, the beacon transmitter may indicate in a transmitted beacon the resources to be used for random access. In another embodiment, the beacon channel of the beacon transmitter defines the resources to be used for random access. The resource for random access may be a resource in the domain of time, frequency or code resources for signal transmission.

Figure 5:
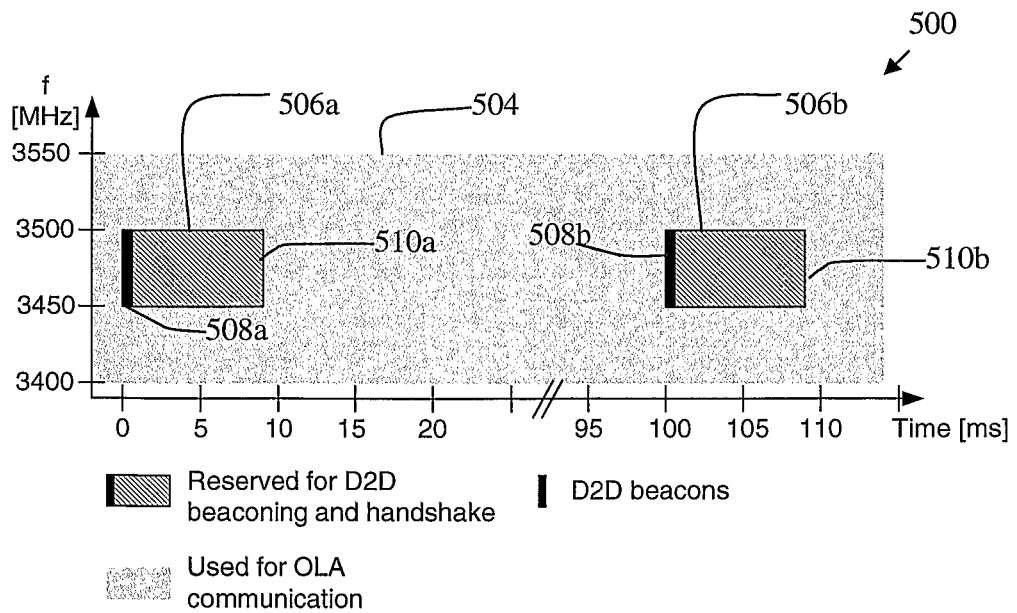
FIG. 5 illustrates an example beaconing resource for OLA communication in accordance with an example embodiment of the invention.

FIG. 5 illustrates an example D2D beaconing and handshake resources 500 for OLA communication in accordance with an example embodiment of the invention. In this example embodiment, a total of 50 MHz frequency resources 504 are reserved for every 100 milliseconds (ms) for OLA communications including D2D beaconing and the subsequent handshake procedure. Out of the reserved OLA communication resource 504, the parts 506a and 506b are reserved for D2D beaconing and handshaking procedure. The reserved resource 506a and 506b contains a D2D beacon slot 508a and 508b and a respective handshake resource 510a and 510b. The beacon slots 508a and 508b take up only a small fraction of the frequency resource 506a and 506b and is then followed by the resource 510a and 510b that are available for the handshake procedure.

Figure 6:
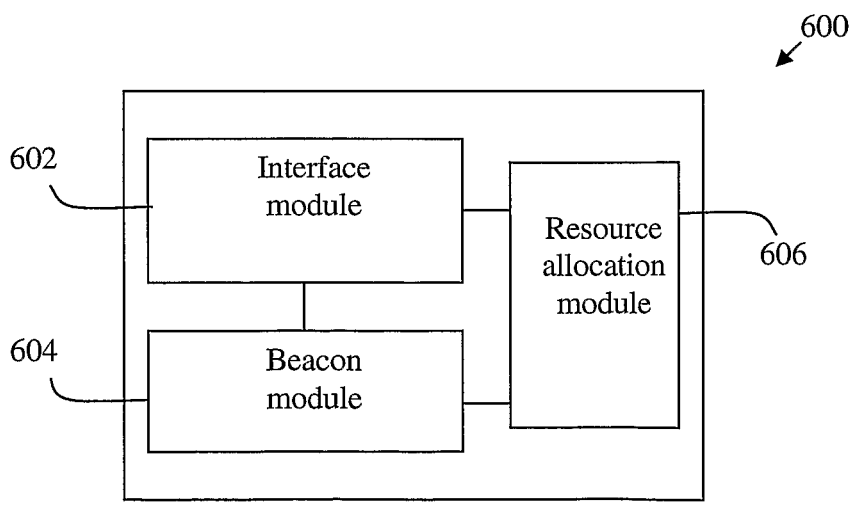
FIG. 6 illustrates an example apparatus for implementing OFDM beaconing in accordance with an example embodiment of the invention.

FIG. 6 illustrates an example apparatus 600 for implementing D2D beaconing in accordance with an example embodiment of the invention. The apparatus 600 includes at least an interface module 602, a beaconing module 604 and a resource allocation module 606.

In one example embodiment, the beacon module 604 is configured to identify at least one beacon opportunity at a wireless network device and select a beacon channel from a beacon slot that is a flexibly allocated frequency resource for beaconing. The interface module 602 is configured to transmit at least one beacon signal in the selected beacon channel multiplexed in an OFDM beacon frame during the identified beacon opportunity. The interface module 602 may be configured to transmit the OFDM beacon frame with a maximum transmission power allowed by the regulation, the access point or the flexible spectrum usage (FSU) algorithm, or with a fractional beacon power decided by the device.

In one example embodiment, the beacon module 604 is configured to wake up from a sleep mode, listen to the beacon signals from the multiple neighbor wireless devices during a beacon opportunity and receive multiple beacons from multiple wireless devices multiplexed in an OFDM beacon frame. The beacon module 604 is also configured to skip one or more beacon opportunities or to select a new beacon channel when it detects a collision of transmission with a neighbor device. In one example embodiment, the resource allocation module 606 is configured to allocate beacon resources such as beacon slot for transmitting or receiving different types of beacons, including D2D beacons and access point beacons if the apparatus 600 is an access point or a base station or a master device of an ad-hoc network.

In one example embodiment, the beacon signal may comprise a primary synchronization sequence, a secondary synchronization sequence and a primary broadcast channel (PBCH). The primary synchronization sequence and the secondary synchronization sequence together may provide a unique identification for the transmitting device. The primary synchronization sequence and the secondary synchronization sequence may be designated or fixed so neighbor devices can recognize a D2D beacon efficiently. In one embodiment, the primary synchronization sequence and the secondary synchronization sequence are similar to long-term evolution (LTE) synchronization sequences. The primary broadcast channel of the beacon signal includes at least one of a system information block, a beacon transmission periodicity, and an indication on whether a next beacon opportunity is skipped. The beacon slot is a D2D beacon slot and may share a resource with one of an access point (AP) beacon and a wireless local area network beacon. The beacon channel may be a D2D beacon channel and defines a synchronization sequence and a periodicity for a beacon transmission.

Figure 7A:
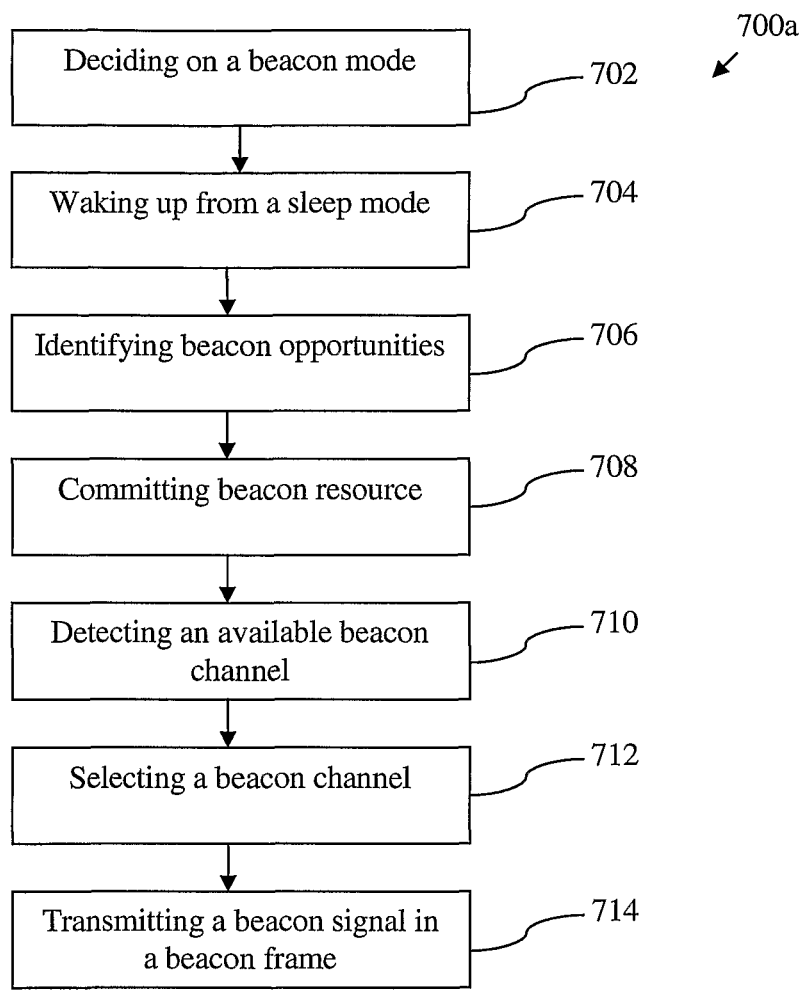
FIG. 7a illustrates an example method for transmitting beacons in accordance with an example embodiment of the invention.

FIG. 7a illustrates an example method 700a for transmitting OFDM beacons. The method 700a includes deciding on a beacon mode at block 702, waking up from a sleep mode at the beacon opportunity 704, and identifying beacon opportunities at block 706. The method 700a also includes committing beacon resource at block 708, detecting a beacon channel at block 710, selecting a beacon channel at block 712, and transmitting beacon signal in the beacon channel of a beacon frame in that beacon slot at block 714.

In one example embodiment, deciding on the beacon mode at block 702 may include determining the status of the transmitting device. For example the transmitting device may be in a slave or mater status if it operates in an ad hoc network or it may be in a peer device status if it operates in a D2D network. The transmitting device may also be in a client device status if it operates in an access point controlled network configuration. The network specific operation role may require additional operation for connectivity maintenance, measurements and data transmission procedures that may be considered when determining the availability of the device for beacon transmissions. In one example embodiment, waking up from a sleep mode at block 704 may include waking up from the sleep mode either at a fixed interval or triggered by an event. If the D2D device is not in a sleep state at the beacon opportunity, this step may be skipped.

In one example embodiment, identifying the beacon opportunities at block 706 may include one or more of the following: tracking resource usage and transmission of the neighbor devices, receiving a notification of the beacon opportunities from an associated access point or an ad-hoc master, receiving a signaling message of the beacon slot from the associated access point or the master device of the ad-hoc network, and detecting a beacon opportunity from a received beacon frame.

In one example embodiment, committing beacon resource at block 708 may depend on the beacon mode of the transmitting device. For example, if the transmitting device is an access point, a base station or a master device of an ad-hoc network, committing beacon resource at block 708 may include allocating beacon slots in a flexible manner rather than in a fixed frequency location. When the beacon slots are allocated with the flexible manner, they may be allocated at any location within a frequency region.

In one example embodiment, detecting an available beacon channel at block 710 may include at least one of the following: identifying a beacon slot in a beacon opportunity, detecting an available beacon channel in the selected beacon slot, and detecting the reserved beacon channels in the selected beacon slot for the D2D beacon transmission. A beacon slot may hence carry a beacon channel with a synchronization sequence and an indication of a periodicity for the beacon transmission.

In one example embodiment, detecting the available beacon channel at block 710 may also include first detecting the reserved beacon channels in a beacon slot. It may be decided whether a beacon channel is available based on a power measurement of a potential beacon signal in that channel, a comparison of the power measurement to a signal power threshold, or an interference power threshold. Alternatively, it may be decided whether the beacon channel is available based on whether there is a correlation between the beacon channel and a specified beacon sequence and whether the correlation results in a positive indication of a presence of a signal. If no beacon signal in the beacon channel is detected, the beacon channel is assumed to be available within the signal range at the moment. The detection process of an available beacon channel may be reinitiated when the UE moves away from the original location or one or more new devices initiate beacon transmissions. The term beacon sequence and the synchronization sequence are used interchangeably throughout this disclosure.

In one example embodiment, selecting the beacon channel at block 712 may include using a random selection scheme to wait for a number beacon opportunities and randomly selecting a beacon channel, assuming that the neighbor devices have a same understanding of the total number of available beacon channels and the beacon slot. In one example embodiment, the total number of the available beacon channels in a beacon slot may be calculated by dividing a size of the allocated beacon slot by a size of beacon signal, which yields a number of beacon channels that can be transmitted in a beacon frame. Selecting the beacon channel at block 712 may also include detecting a number of available beacon channels and selecting randomly an available channel for its beacon transmission. The random selection of an available channel avoids the re-use of the same beacon resources in the range of the signal without signaling between the D2D beacon transmitters, and as a result the signaling between D2D beacon transmitters is simplified and reduced.

In one example embodiment, selecting the beacon channel at block 712 may alternatively include selecting a beacon channel in a coordinated manner without any knowledge of the available beacon slot. The coordinated beacon channel selection may be based on criteria such as minimizing the spectrum for beacon transmission, or minimizing the number of synchronization sequences in a beacon channel.

In one example embodiment, selecting a beacon channel at block 712 may be performed in a coordinated manner by causing each beacon channel to have a designated number of synchronization sequences in use before a next channel is used. Because only a small set of synchronization sequences may be designated for D2D beacons, a neighbor device may recognize a D2D beacon efficiently. The D2D beacon signals within a beacon channel may be transmitted using code division multiple access whereas the code used by a device may depend on the used synchronization sequence. Selecting the beacon channel at block 712 may also include selecting a new D2D beacon channel that is immediately adjacent to the previous beacon channel. For example, the previous D2D beacon slot contains beacon channels 3 through 7, the new D2D beacon channel 2 or 8 may be selected. In addition, selecting the beacon channel may also include selecting the new beacon channel based on the quality and utilization of the new beacon channels.

In one example embodiment, selecting the beacon channel at block 712 may also include selecting a beacon channel in a hybrid manner, such as selecting a synchronization sequence of the beacon channel randomly and selecting the beacon channel itself in a coordinated manner. Alternatively, the beacon channel may be selected randomly and the synchronization sequence of the beacon channel is selected in a coordinated manner as described above.

In one example embodiment, selecting the beacon channel at block 712 may include selecting the beacon channel among the available channels in the beacon slot in one of the following methods. The methods include selecting an available beacon channel with a lowest index of the available beacon channels, selecting an available beacon channel with a highest index of the available beacon channels, and selecting a beacon channel randomly from among the set of available beacon channels. In another embodiment, selecting the beacon channel at block 712 may include taking into consideration whether the transmitting D2D device has received any D2D beacon. If the D2D device has not received any D2D beacon, selecting a beacon channel at block 712 may include initiating a resource area, such as a beacon slot, for D2D beaconing and selecting one or more transmission times for the D2D beacons. If one or more D2D beacons with different timings have been received, selecting beacon slot at block 712 may include selecting one or more D2D beacon transmission times, allowing the transmitting device to participate in none, some or all beacon opportunities. Alternatively selecting the beacon slot at block 712 may include triggering a synchronization procedure that merges separate, non-contiguous transmission resources into one contiguous area. Selecting the beacon channel at block 712 may also include reselecting a beacon channel after detecting a collision of the transmissions in the selected beacon slot with one or more neighboring devices.

In one example embodiment, transmitting beacon frame at block 714 may include transmitting OFDM beacons with potentially many other neighbor D2D devices transmitting beacons at the same time. Transmitting the beacon at block 714 may also include transmitting the D2D beacon frame with a maximum transmission power allowed by the regulation to achieve a maximum coverage for the transmitted beacon frames. Transmitting the beacon frame at block 714 may also include transmitting D2D beacon frames that have a constant interval of beacon opportunities between the consecutive D2D beacons transmissions. In one example embodiment, transmitting the beacon frame at block 714 may also include transmitting an indication with one or more bits in the D2D beacon to inform neighbor devices about the constant interval of beacon opportunities between consecutive D2D beacons.

In one example embodiment, transmitting the beacon frame at block 714 may also include setting a bit in the D2D beacon to inform neighbor devices whether the transmitting device intends to skip the D2D beacon transmission at the next beacon opportunity. Thus a beacon transmission may be skipped to allow the transmitting device to listen to other beacon transmissions during its own D2D beacon transmission time. Transmitting the beacon frame at block 714 may also include transmitting one or more extra beacon in addition to the scheduled D2D beacon transmissions. The extra beacons may enable the neighbor D2D devices with the same D2D beacon transmission periodicity as that of the transmitting device to have a better chance to receive the transmitted beacons. If the transmitting device detects that multiple devices are transmitting D2D beacons at the same beacon channel and with the same synchronization sequence, then the transmitting device may consider retransmitting extra D2D beacons.

Figure 8:
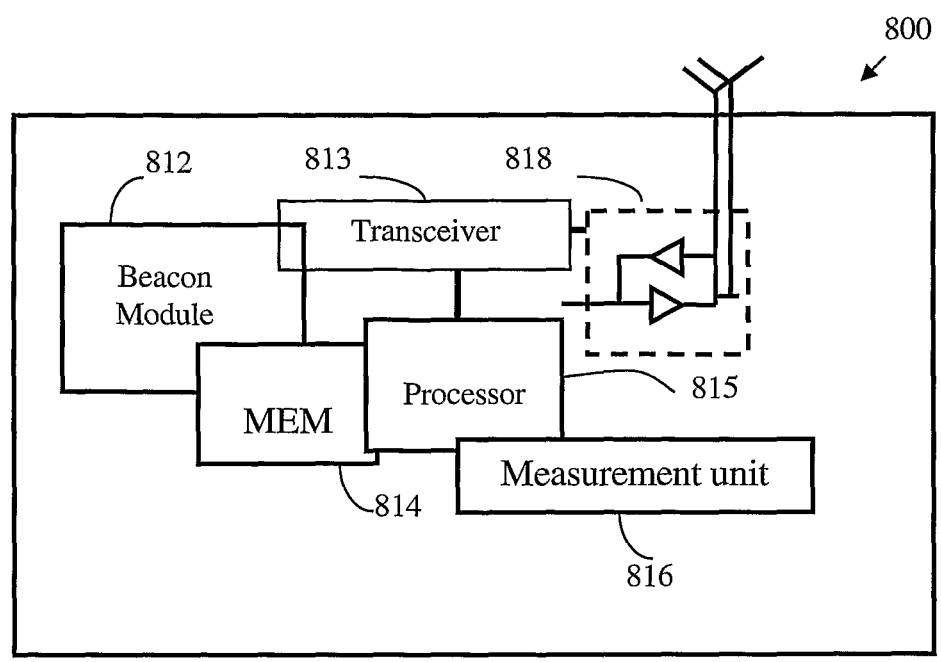
FIG. 8 illustrates an example apparatus for implementing the D2D beaconing in accordance with an example embodiment of the invention.

In one example embodiment, the method 700a may be implemented in any of the UEs 101a, 102b and 102c of FIG. 1a, in the wireless apparatus 600 of FIG. 6 or in the apparatus 800 of FIG. 8. The method 700a is for illustration only and the steps of the method 700a may be combined, divided, or executed in a different order than illustrated, without departing from the scope of this example embodiment of the invention.

Figure 7B:
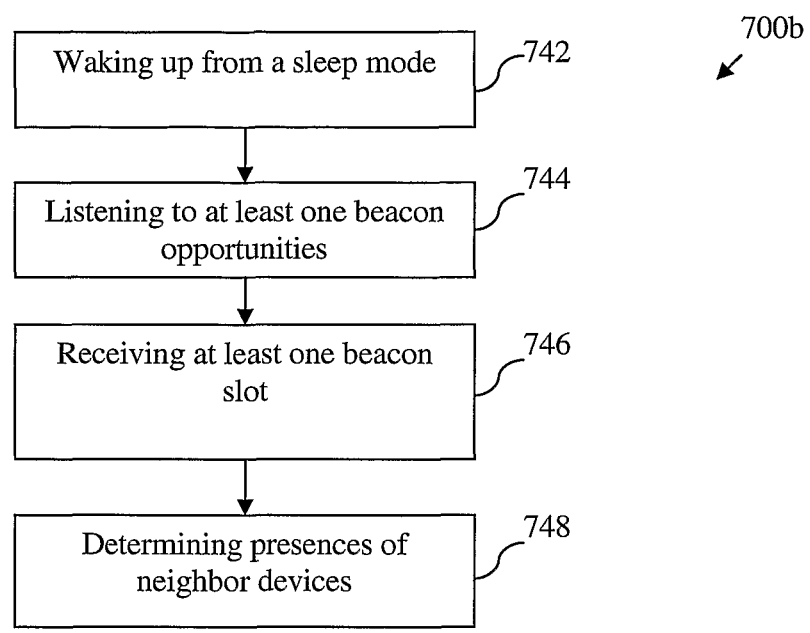
FIG. 7b illustrates an example method for receiving beacons in accordance with an example embodiment of the invention.

FIG. 7b illustrates an example method 700b for receiving an OFDM beacon. The method 700b includes waking up from a sleep mode at block 742, listening for a number of beacon opportunities at block 744, receiving at least one OFDM beacon slot at block 746 and determining presences of neighbor devices at block 748.

In one example embodiment, waking up from a sleep mode at block 742 may include waking up from the sleep mode either at a fixed interval or triggered by an event. If the D2D device is not in a sleep mode to begin with, this step may be skipped. In one example embodiment, listening for a number of beacon opportunities at block 744 may include listening for a number of beacon opportunities to decide whether there is an in-progress beacon transmission by one or more neighbor D2D devices. The number of beacon opportunities the receiving device listens to may be decided randomly or predetermined.

In one example embodiment, receiving at least one beacon slot at block 746 may include receiving multiple OFDM beacon signals multiplexed into the OFDM beacon frame. Receiving the beacon slot at block 746 may include receiving the OFDM beacon slot at a fixed receiving periodicity or on demand. Receiving the at the OFDM beacon slot at block 746 may include receiving a next beacon slot within a maximum beacon interval wherein the maximum beacon interval is defined by a standard, assigned by an associated access point, or negotiated on demand between two neighbor devices that are in a D2D mode of operation. Receiving the at least one beacon slot at block 746 may also include skipping one or more beacon opportunities and listening again if a collision is detected.

In one example embodiment, determining presences of neighbor devices from the received OFDM beacon at block 748 may include demultiplexing the received OFDM beacon frame, decoding the beacon channels, detecting the presence of a beacon signal in a channel of the received beacon frame and deciding whether a received beacon signal is from a known neighbor D2D device or a new one. Detecting presence of a beacon in the beacon channel may be based on a power measurement of a potential beacon signal in that channel, a comparison of the power measurement to a signal power threshold, or an interference power threshold. Alternatively, detecting the presence of a beacon signal may be based on whether there is a correlation between the beacon signal and a specified beacon sequence and whether the correlation results in a positive indication of a presence of a signal. Determining presences of neighbor devices at block 748 may also include updating the status of the neighbor D2D devices from the received OFDM beacon frames.

In one example embodiment, the method 700b may be implemented in any of the UEs 101a, 102b and 102c of FIG. 1a, in the wireless apparatus 600 of FIG. 6 or in the apparatus 800 of FIG. 8. The method 700b is for illustration only and the steps of the method 700b may be combined, divided, or executed in a different order than illustrated, without departing from the scope of the invention of this example embodiment. The method 700a and method 700b may be implemented at a same device or at different devices independently of each other.

FIG. 8 is a block diagram illustrating an example wireless apparatus 800 for implementing the beaconing for D2D communication in accordance with an example embodiment of the invention. In FIG. 8, the wireless apparatus 800 may include a processor 815, a memory 814 coupled to the processor 815, and a suitable transceiver 813 (having a transmitter (TX) and a receiver (RX)) coupled to the processor 815, coupled to an antenna unit 818. The memory 814 may store programs such as a beacon module 812. The wireless apparatus 800 may be at least part of a 4$^{th}$ generation mobile station, an access point and a LTE compliant base station.

The processor 815 or some other form of generic central processing unit (CPU) or special-purpose processor such as digital signal processor (DSP), may operate to control the various components of the wireless apparatus 800 in accordance with embedded software or firmware stored in memory 814 or stored in memory contained within the processor 815 itself. In addition to the embedded software or firmware, the processor 815 may execute other applications or application modules stored in the memory 814 or made available via wireless network communications. The application software may comprise a compiled set of machine-readable instructions that configures the processor 815 to provide the desired functionality, or the application software may be high-level software instructions to be processed by an interpreter or compiler to indirectly configure the processor 815.

In an example embodiment, the beacon module 812 may be configured to identify at least one beacon opportunity at a wireless network device, select a beacon channel from a beacon slot that is a flexibly allocated frequency resource, and transmit at least one beacon signal in the selected beacon channel multiplexed in a beacon frame during the identified beacon opportunity. The beacon module 812 may also be configured to receive at least one beacon frame from at least one neighbor wireless device during the identified beacon opportunity and determine a presence of at least one neighbor device from the at least one received beacon frame.

As shown in FIG. 8, the wireless apparatus 800 may further include a measurement unit 816, which measures the signal strength level that is received from another wireless device, and compare the measurements with a configured threshold. The measurement unit may be utilized by the wireless apparatus 800 in conjunction with various exemplary embodiments of the invention, as described herein.

In general, the various exemplary embodiments of the wireless apparatus 800 may include, but are not limited to, part of a user equipment, or a wireless device such as a portable computer having wireless communication capabilities, Internet appliances permitting wireless Internet access and browsing, as well as portable units or terminals that incorporate combinations of such functions. In one embodiment, the wireless apparatus 800 may be implemented in one of the UEs 102a through 102c of FIG. 1a.

Without in any way limiting the scope, interpretation, or application of the claims appearing below, a technical effect of one or more of the example embodiments disclosed herein is to enable multiple neighbor devices to transmit multiple D2D beacons in an OFDM beacon frame at proximately same time. Thus one device may receive multiple D2D beacons at one time and detect presences of neighbor devices in an efficient manner.

Embodiments of the present invention may be implemented in software, hardware, application logic or a combination of software, hardware and application logic. The software, application logic and/or hardware may reside on a user equipment, a base station or an access point. If desired, part of the software, application logic and/or hardware may reside on access point, part of the software, application logic and/or hardware may reside on a network element such as a UE, and part of the software, application logic and/or hardware may reside on a peer network element such as a base station or an access point. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising
identifying at least one beacon opportunity at a wireless network device;
selecting a beacon channel from a beacon slot that is a flexibly allocated frequency resource, wherein selecting the beacon channel comprises selecting a beacon channel randomly from among available beacon channels;
transmitting at least one beacon signal in the selected beacon channel multiplexed in an orthogonal frequency-division multiple access frame during the identified beacon opportunity; and
wherein the at least one beacon signal is concentrated in the beacon slot, and
wherein selecting the beacon channel comprises selecting the beacon slot with a synchronization sequence and an indication of a periodicity for the at least one beacon signal transmission.

2. The method of claim 1, wherein the at least one beacon signal is concentrated in a single radio frame and in a single frequency band in the beacon slot.

3. The method of claim 2, wherein selecting the beacon channel comprises determining a total number of available beacon channels with a selected beacon slot wherein the total number of the available beacon channels in the selected beacon slot is calculated by dividing a size of the allocated beacon slot by a size of a beacon signal, which yields a number of beacon channels available for transmitting frames.

4. The method of claim 1, wherein selecting the beacon channel further comprises at least one of
selecting an available beacon channel with a lowest index among available beacon channels; and
selecting the available beacon with a highest index of the beacon channels.

5. The method of claim 1, wherein selecting the beacon channel comprises at least one of
selecting a D2D (device to device) beacon channel that is immediately adjacent to a previous beacon channel; and
selecting the D2D beacon channel based on one or more of quality and utilization criteria of the D2D beacon channel.

6. The method of claim 1, wherein selecting the beacon channel comprises selecting the beacon channel that meets at least one of following:
minimizing a spectrum usage for beacon transmission;
minimizing an amount of synchronization sequences in a channel; and
maximizing a channel quality.

7. The method of claim 1, wherein transmitting the beacon signal further comprises at least one of:
transmitting an extra D2D beacon signal due to one of a collision with a neighbor D2D device with a same D2D beacon transmission periodicity, an on-demand request from an application, and a specified traffic condition;
setting a skip bit in the beacon signal to notify neighbor devices that next one or more beacon opportunities are skipped for beacon transmission;
skipping one or more beacon opportunities if the skip bit is set in a preceding beacon signal.

8. A method, comprising
identifying a beacon opportunity at a network device;
selecting a beacon channel from a beacon slot that is a flexibly allocated frequency resource, wherein selecting the beacon channel comprises selecting a beacon channel randomly from among available beacon channels;
receiving at least one orthogonal frequency division multiple access frame from at least one neighbor wireless device during the identified beacon opportunity, wherein a beacon signal is concentrated in the beacon slot; and
determining a presence of at least one neighbor D2D device from the at least one received orthogonal frequency division multiple access frame, wherein the beacon slot selected is with a synchronization sequence and an indication of a periodicity for the beacon signal.

9. The method of claim 8, wherein receiving the at least one orthogonal frequency division multiple access frame comprises receiving a next orthogonal frequency division multiple access frame from a selected beacon slot within a maximum beacon interval wherein the maximum beacon interval is defined by a standard, assigned by an associated access point, or negotiated on demand between two neighbor devices that are in a D2D mode of operation.

10. An apparatus, comprising:
at least one processor; and
at least one memory including computer program code,
wherein the at least one memory and the computer program code are configured to, with the at least one processor, cause the apparatus to at least:
identify at least one beacon opportunity at a wireless network device;
select a beacon channel from a beacon slot that is flexibly allocated in a frequency resource, wherein selecting the beacon channel comprises selecting a beacon channel randomly from among available beacon channels;
transmit at least one beacon signal in the selected beacon channel multiplexed in an orthogonal frequency division multiple access frame during the identified beacon opportunity; and
wherein the at least one beacon signal is concentrated in the beacon slot, and
wherein selecting the beacon channel comprises selecting the beacon slot with a synchronization sequence and an indication of a periodicity for the at least one beacon signal transmission.

11. The apparatus of claim 10, wherein the at least one memory and the computer program code are further configured to, with the at least one processor, cause the apparatus to receive at least one orthogonal frequency division multiple access frame from at least one neighbor wireless device; and to determine a presence of at least one neighbor D2D (device to device) device from the at least one received orthogonal frequency division multiple access frame.

12. The apparatus of claim 10, wherein the at least one memory and the computer program code are further configured to, with the at least one processor, cause the apparatus to allocate the beacon slot if the apparatus is one of an access point and a base station.

13. The apparatus of claim 10, wherein the at least one beacon signal comprises a primary synchronization sequence, a secondary synchronization sequence and a primary broadcast channel, wherein the primary synchronization sequence and the secondary synchronization sequence together provide a unique identification for the apparatus.

14. The apparatus of claim 10, wherein the primary synchronization sequence and the secondary synchronization sequence are designated so neighbor devices can recognize a D2D beacon efficiently.

15. The apparatus of claim 10, wherein the primary broadcast channel of the beacon signal includes at least one of a system information block, a beacon transmission periodicity, and an indication on whether a next beacon opportunity is skipped.

16. The apparatus of claim 10, wherein the beacon slot is a D2D beacon slot and shares a resource with one of an access point beacon and a wireless local area network beacon.

17. The apparatus of claim 10, wherein the beacon channel is a D2D beacon channel and defines a synchronization sequence and a periodicity for a beacon transmission.

18. The apparatus of claim 10, wherein the apparatus is configured to be in one of a transmitting state, a receiving state and a dozing state.

19. The apparatus of claim 10, wherein the orthogonal frequency division multiple access frame comprises a plurality of orthogonal frequency division multiple access beacon channels in a single radio frequency band.

20. An apparatus, comprising:
at least one processor; and
at least one memory including computer program code,
wherein the at least one memory and the computer program code are configured to, with the at least one processor, cause the apparatus to at least:
identify a beacon opportunity at a network device;
select a beacon channel from a beacon slot that is a flexibly allocated frequency resource for beaconing purpose, wherein selecting the beacon channel comprises selecting a beacon channel randomly from among available beacon channels;
receive at least one orthogonal frequency division multiple access frame from at least one neighbor wireless device, wherein a beacon signal is transmitted within the orthogonal frequency division multiple access frame and concentrated in the beacon slot; and
determine a presence of at least one neighbor D2D device from the at least one received orthogonal frequency division multiple access frame, wherein the beacon slot selected is with a synchronization sequence and an indication of a periodicity for the beacon signal transmission.

21. A non-transitory computer readable medium storing a program of instructions, execution of which by a processor configures an apparatus to at least:
identify at least one beacon opportunity at a wireless network device;
select a beacon channel from a beacon slot that is a flexibly allocated frequency resource for beaconing, wherein selecting the beacon channel comprises selecting a beacon channel randomly from among available beacon channels;
transmit at least one beacon signal in the selected beacon channel multiplexed into an orthogonal frequency division multiple access frame during the identified beacon opportunity; and
wherein the at least one beacon signal is concentrated in the beacon slot, and
wherein selecting the beacon channel comprises selecting the beacon slot with a synchronization sequence and an indication of a periodicity for the at least one beacon signal transmission.

* * * * *